United States Patent
Nagano

[11] Patent Number: 6,118,095
[45] Date of Patent: Sep. 12, 2000

[54] CONTROL DEVICE FOR RESISTANCE WELDER

[75] Inventor: Yoshihiro Nagano, Kanagawa, Japan

[73] Assignee: Dengensha Manufacturing Company Limited, Kanagawa, Japan

[21] Appl. No.: 09/277,940

[22] Filed: Mar. 29, 1999

[30] Foreign Application Priority Data

Feb. 3, 1999 [JP] Japan ................... 11-063767
Feb. 25, 1999 [JP] Japan ................... 11-048984

[51] Int. Cl.⁷ .................................................. B23K 11/24
[52] U.S. Cl. .......................................... 219/110; 219/109
[58] Field of Search .................... 219/110, 109, 219/86.41, 86.7; 901/42

[56] References Cited

U.S. PATENT DOCUMENTS

| | | | |
|---|---|---|---|
| 3,400,242 | 9/1968 | Waller | 219/110 |
| 3,404,252 | 10/1968 | Michael | 219/110 |
| 3,569,659 | 3/1971 | Benton et al. | 219/110 |
| 3,585,347 | 6/1971 | Needham et al. | 219/110 |
| 3,708,648 | 1/1973 | Croucher et al. | 219/109 |
| 4,005,307 | 1/1977 | Tamura et al. | 219/109 |
| 5,194,709 | 3/1993 | Ichikawa et al. | 219/109 |
| 5,340,960 | 8/1994 | Takasaki et al. | 219/86.7 |
| 5,510,593 | 4/1996 | Sakai | 219/86.7 |
| 5,558,785 | 9/1996 | Killian et al. | 219/110 |

FOREIGN PATENT DOCUMENTS

| | | |
|---|---|---|
| 48-41422 | 12/1973 | Japan. |
| 53-938 | 1/1978 | Japan. |
| 53-4057 | 2/1978 | Japan. |
| 60-40955 | 9/1985 | Japan. |
| 60-56598 | 12/1985 | Japan. |
| 61-15795 | 4/1986 | Japan. |
| 10-128552 | 5/1998 | Japan. |

*Primary Examiner*—Clifford C. Shaw
*Attorney, Agent, or Firm*—Sughrue, Mion, Zinn, Macpeak & Seas, PLLC

[57] ABSTRACT

In a resistance spot welder in which an operation of pressurizing an electrode is conducted by an electric servo motor, an amount of thermal expansion due to production of a weld nugget is detected every moment by reading an encoder which is incorporated in the servo motor. When the detected amount of thermal expansion reaches a preset reference value, it is judged that the weld nugget attains a predetermined strength, thereby stopping a current supply. According to this configuration, a predetermined amount of input heat is ensured, so that an excellent welding quality is surely obtained.

6 Claims, 5 Drawing Sheets

CONTROL DEVICE FOR RESISTANCE WELDER

BACKGROUND OF THE INVENTION

1. Field of the Invention

The present invention relates to a control device for a resistance welder wherein, in a resistance spot welder in which an operation of pressurizing an electrode is conducted by an electric servo motor. An amount of thermal expansion of a welded part due to production of a weld nugget is detected by reading an encoder which is incorporated in the servo motor, thereby ensuring the welding quality or judging the welding quality.

2. Description of the Related Art

A technique of, in a resistance spot welding, conducting judgment on the quality of a welded part by detecting an amount of thermal expansion of the welded part during a current supply has been known. The amount of thermal expansion of a welded part is detected by detecting the amount of movement of a movable electrode during a welding. Conventionally, the amount of displacement of an electrode is detected in the following manner. An air pressure due to a minute stroke change of a rack and pinion mechanism or a movable electrode is detected as an output of a detector, or a position sensor such as a linear potentiometer is disposed between stationary and movable electrodes of a resistance welder.

Further, a system exists in which the pressurizing force is detected from the current supplied to a servo motor, and, when a weld nugget is produced by thermal expansion during a current supply, the position of an electrode is controlled by means of an encoder of the servo motor in accordance with the detected pressurizing force, thereby obtaining a desired welding quality.

The position sensor of the former technique is disposed in the vicinity of an electrode which conducts a welding operation, and hence has problems in that the position sensor is easily damaged during a welding operation by splashes scattering from a welded part, and that, depended on the shape of a workpiece, the position sensor may mechanically interfere with the workpiece.

In the latter technique or the electrode position control system using a servo motor, the position of an electrode can be made constant even when the amount of thermal expansion of a welded part is changed owing to production of a weld nugget of the base metal. However, the system cannot conduct processing in which, an amount of thermal expansion of a welded part is detected by reading an encoder which is incorporated in the servo motor, the welding quality is judged, monitoring results of the judgment are supplied to a host computer, the history is statistically processed to know the wearing state of an electrode chip, the tendency of success in welding position of a specific spot, etc.

SUMMARY OF THE INVENTION

The invention has been conducted in order to solve the problems of a resistance spot welder in which an operation of pressurizing an electrode is conducted by an electric servo motor. When such an electric servo motor is to be used in a pressure applying operation of a welder, the rotating operation is usually converted into a linear operation by a ball screw or the like. In this case, the position and speed of a movable electrode are controlled by detecting a signal of an encoder which is disposed inside the servo motor, usually on the rotation shaft and on the side opposite to the movable electrode.

In the invention, the amount of displacement of a movable electrode is detected by means of a signal of an encode in a servo motor, in place of a position sensor which is disposed in the vicinity of an electrode. The encoder is physically used also in a servo control. However, the amount of displacement of the movable electrode is calculated independently of the servo control. Since the encoder is disposed in a place which is remote from the electrodes, there arises no problem of a damage due to splashes or mechanical interference. Since an encoder which is already disposed for the servo control is used also in the detection, the invention is advantageous also in durability and production cost.

Features and advantages of the invention will be evident from the following detailed description of the preferred embodiments described in conjunction with the attached drawings.

DETAILED DESCRIPTION OF THE PREFERRED EMBODIMENTS

Figure 1:
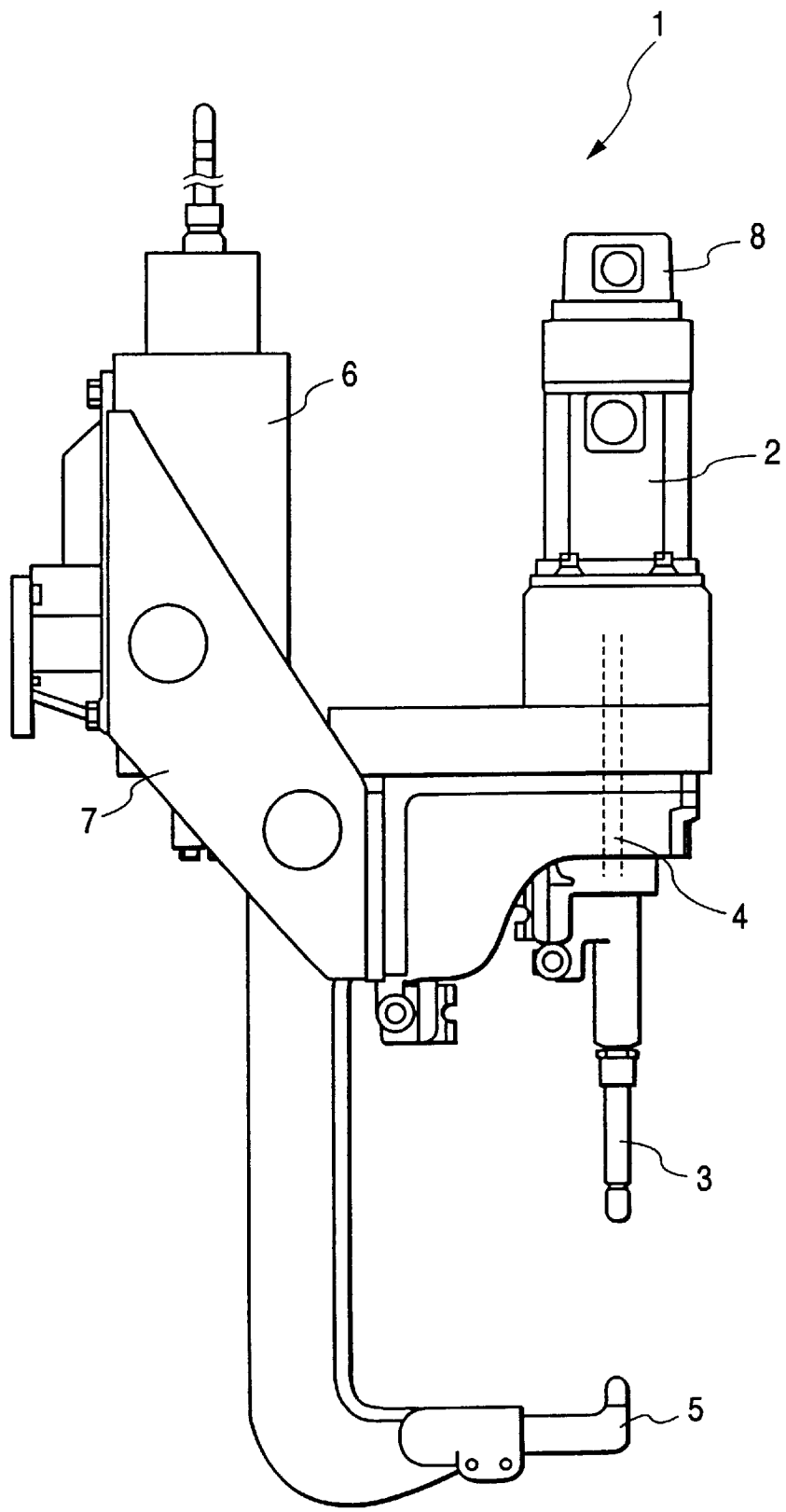
FIG. 1 is a diagram showing an embodiment in which the invention is applied to a servo spot welding gun.
Figure 2:
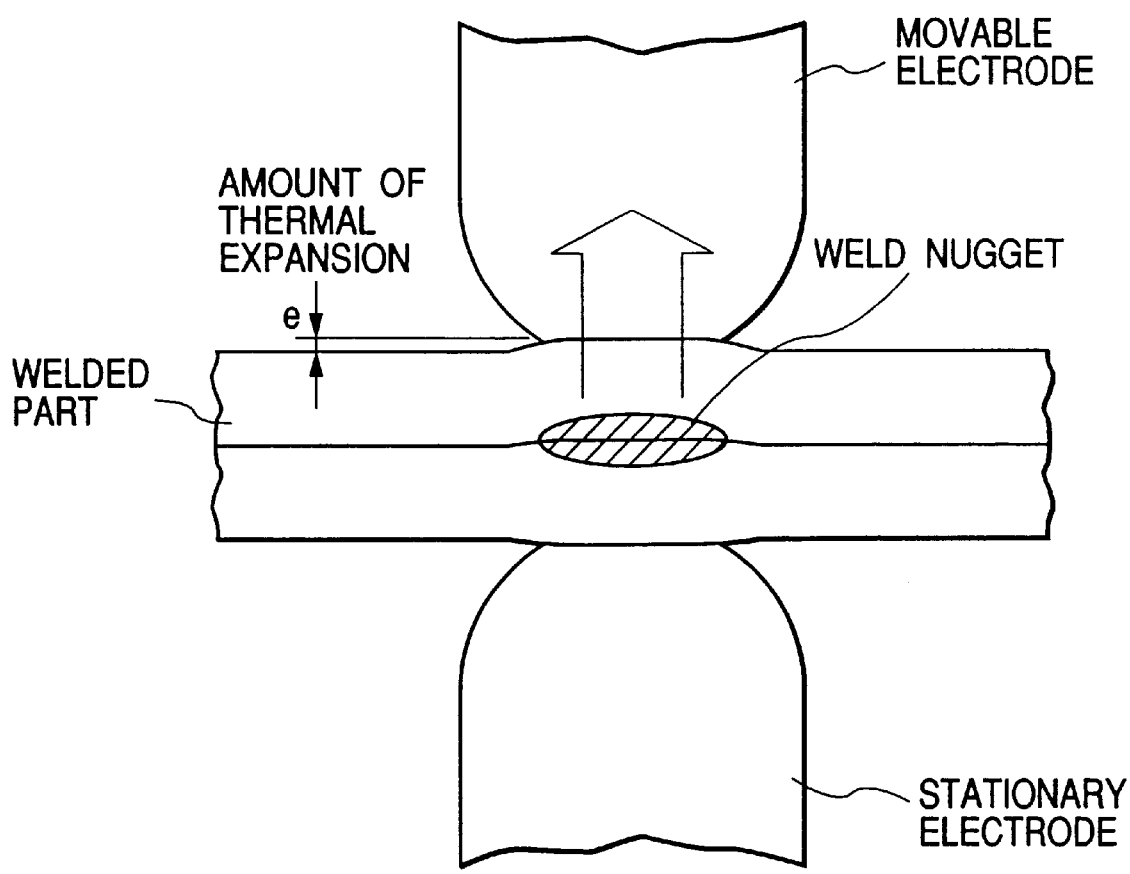
FIG. 2 is a view illustrating a displacement of an electrode due to thermal expansion of a welded part.

FIG. 1 shows an example in which the invention is applied to a servo spot welding gun, and FIG. 2 is a sectional view of a welded part and showing movement of an electrode due to thermal expansion of the welded part.

In the servo spot welding gun 1, a movable electrode 3 is driven by a single servo motor 2 via a ball screw 4, a screw nut, etc. A stationary electrode 5 operates in the following manner. In order to allow the whole of the gun to be floated by a spring or the like, the whole of the gun is shifted via an equalizing mechanism (not shown) with respect to a gun bracket 7 which supports a welding transformer 6, thereby forming a structure in which a load pressure applied to a workpiece can be absorbed. An encoder 8 is disposed on the side opposite to the electrodes and coaxially with the motor shaft of the servo motor 2.

Figure 3:
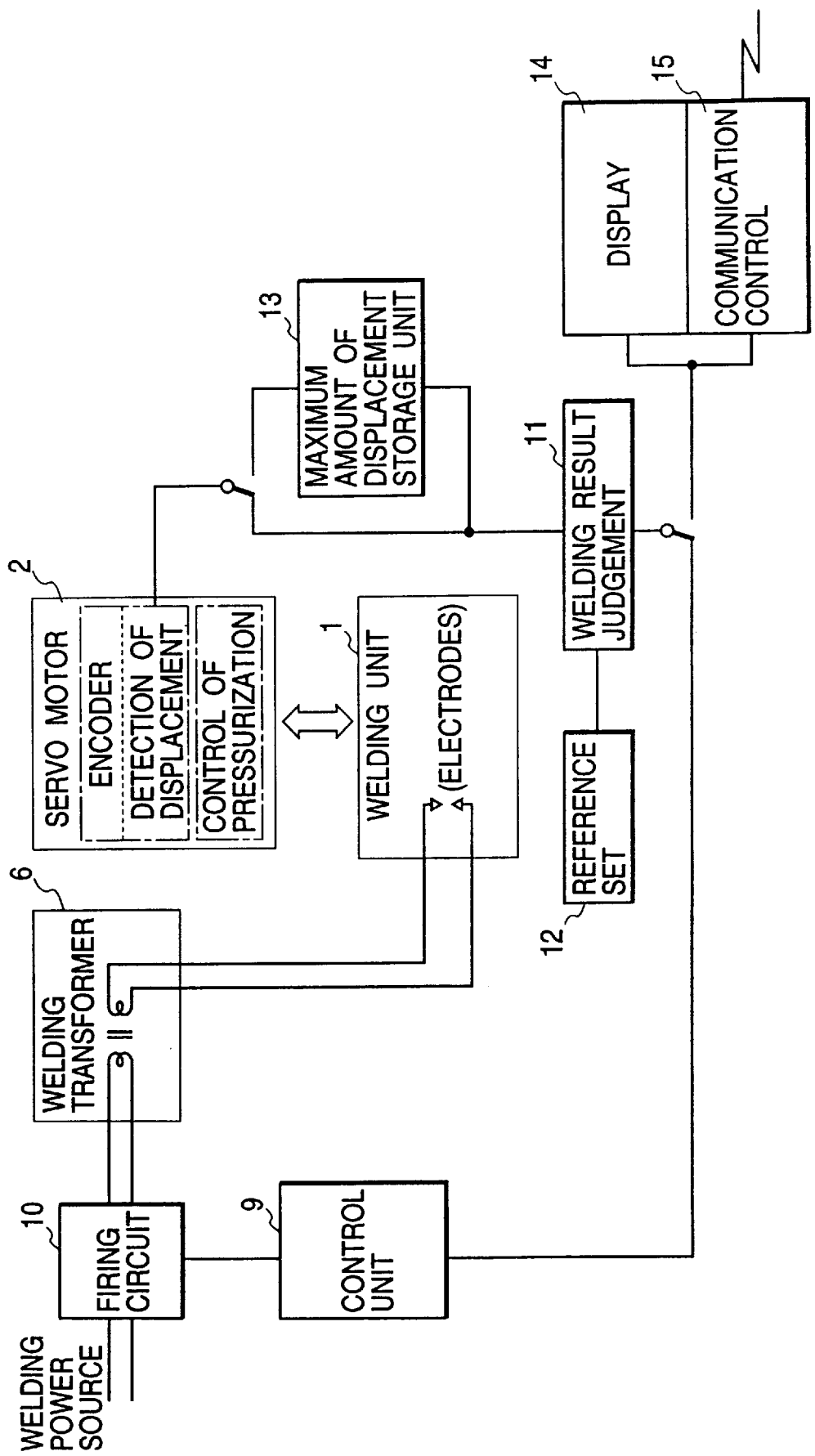
FIG. 3 is a block diagram of an electric circuit of an embodiment of the control device for a resistance welder according to the invention.

FIG. 3 shows a block diagram of an electric circuit of an embodiment of the control device for a resistance welder according to the invention.

In the figure, the reference numeral 1 denotes a servo spot welding gun having a movable electrode 3 and a stationary electrode 5. A workpiece is pressed between the electrodes, and a welding current is supplied to the workpiece, thereby conducting a welding operation. The reference numeral 2 denotes a servo motor. The operations of pressurizing and releasing the electrodes are controlled by means of the servo motor. The reference numeral 9 denotes a control unit for the whole of the device, 10 denotes a firing circuit which turns on or off a welding transformer 6, and 6 denotes the welding transformer which supplies a current to a welded part.

The reference numeral 11 denotes a welding result judging unit which judges a result of a weld nugget, and which conducts the following two kinds of controls. The first control is conducted for judging a welding result during a welding process. The amount of displacement due to thermal expansion during welding is detected by reading an encoder of the servo motor. The detection result is compared with data of a reference value setting unit 12 which stores a preset amount of displacement. If the amount of displacement is larger than the preset one, the current supply is controlled via the control unit so as to be immediately stopped.

The second control is conducted for judging a welding result after a welding process is completed. The maximum amount of displacement due to thermal expansion during welding is stored in a storage unit 13. After a welding process is completed, the stored amount is compared with data of the reference value setting unit 12 which stores a preset amount of displacement. If the amount of displacement is not smaller than the preset one, "OK" is displayed on a display unit 14. If the amount of displacement is not larger than the preset one, "NG" is displayed or an alarm signal is given to the outside via a communication control unit 15.

A servo motor is characterized in that its current location (position, speed, and the like) can be correctly known. In order to realize the characteristics, a servo motor is provided with an encoder. In the invention, as described above, judgment on a welding result can be conducted by using an output signal of an encoder of a servomotor, and without disposing a special detector dedicated to the judgment.

Figure 4A:
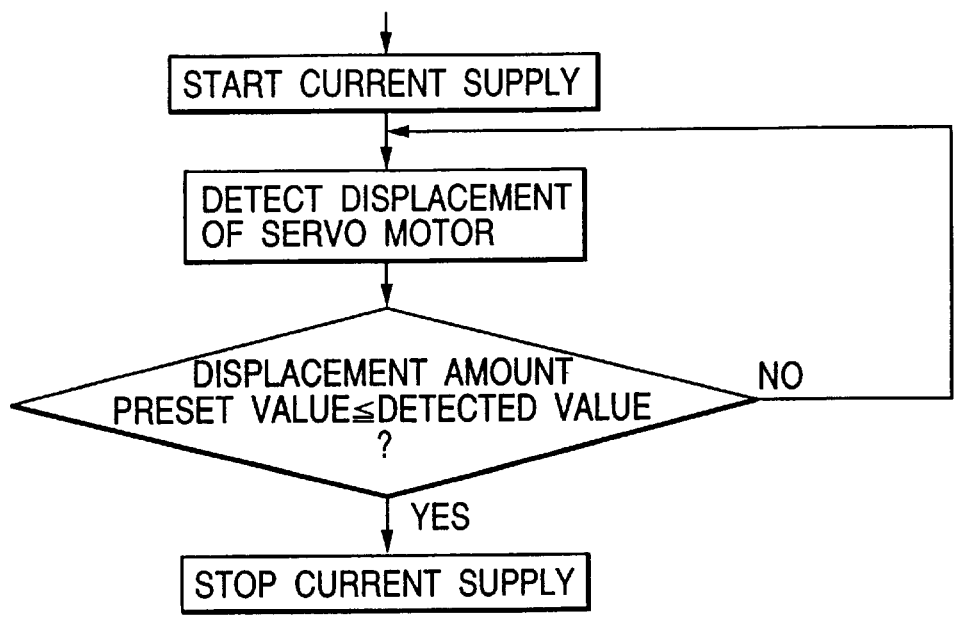
FIGS. 4A and 4B show operation flowcharts according to the invention.

Hereinafter, the operation of the invention will be described with reference to FIG. 2, and the operation flowcharts of FIGS. 4A and 4B.

Prior to a welding operation, the servo motor 2 drives the movable electrode 3 via the ball screw 4. When the tip end of the movable electrode 3 reaches the surface of a workpiece W positioned on the stationary electrode 5, the rotation of the servo motor 2 is mechanically stopped. As a result, the armature current of the motor 2 is suddenly increased.

When the sudden increase of the armature current is detected, the value of the encoder 8 at this timing is read. This value is stored as the zero point of the electrode position. Next, as shown in the flowchart of FIG. 4A, a pressurizing force is applied to the workpiece W sandwiched between the movable electrode 3 and the stationary electrode 5, and a current is supplied, thereby starting a welding operation. As the heating of the welded part advances and a weld nugget grows, the thermal expansion of the welded part proceeds.

The thermal expansion produces a force which forcedly pushes the movable electrode 3 in the thickness direction as indicated by the arrow of FIG. 2. As a result, the movable electrode 3 is moved, and the ball screw is reversely rotated, thereby causing the amount of reverse rotation to appear in the signal of the encoder 8.

This amount is detected every moment as the amount of movement of the electrode due to the thermal expansion amount e. When the amount of reverse rotation reaches the preset reference value, it is judged that a weld nugget of a predetermined welding strength is obtained, and the current supply is stopped.

Figure 4B:
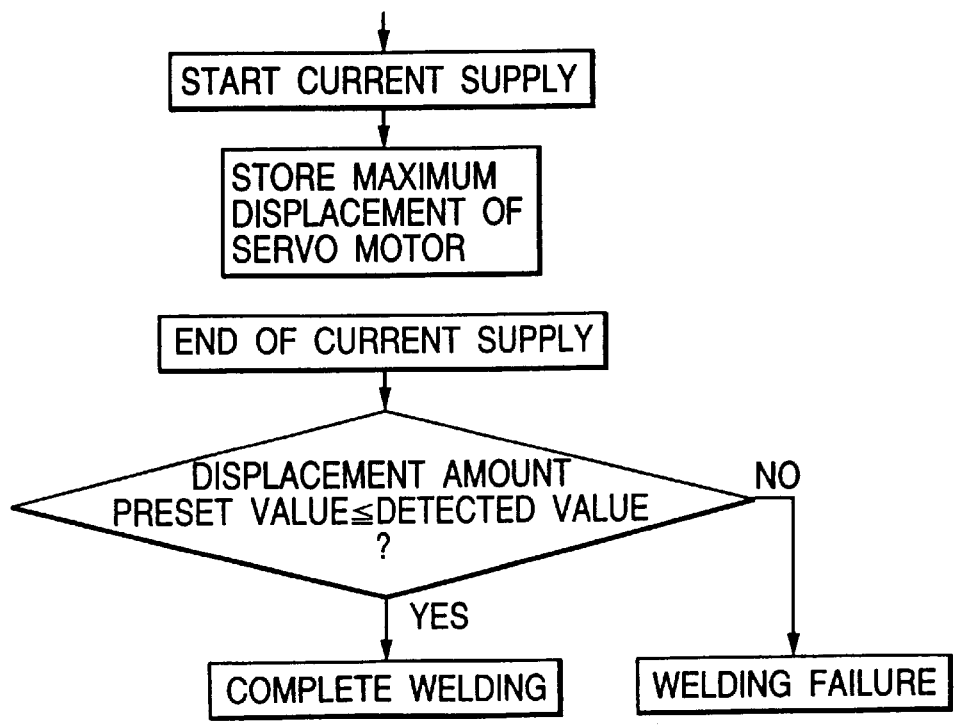

Alternatively, as shown in the flowchart of FIG. 4B, the detected maximum value is held. After the welding is ended, the maximum value which is detected during the welding is compared with the reference value which is previously set in the storage unit of the control device, to judge the quality of the welding result. If the maximum value fails to reach the reference value, an alarm signal of welding failure is given to the outside.

Figure 5:
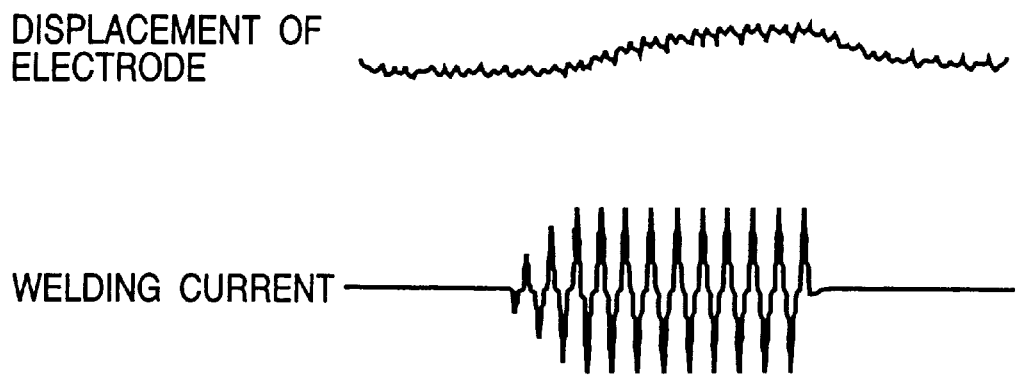
FIG. 5 is a waveform chart showing mutual relationships between a welding current and movement of an electrode in a welding process.

FIG. 5 shows waveform changes which indicate mutual relationships between the welding current and the movement of the electrode in a welding process. In this case, the amount of the electrode displacement output from the encoder of the servo motor is detected so as to be used in the judgment.

Figure 6:
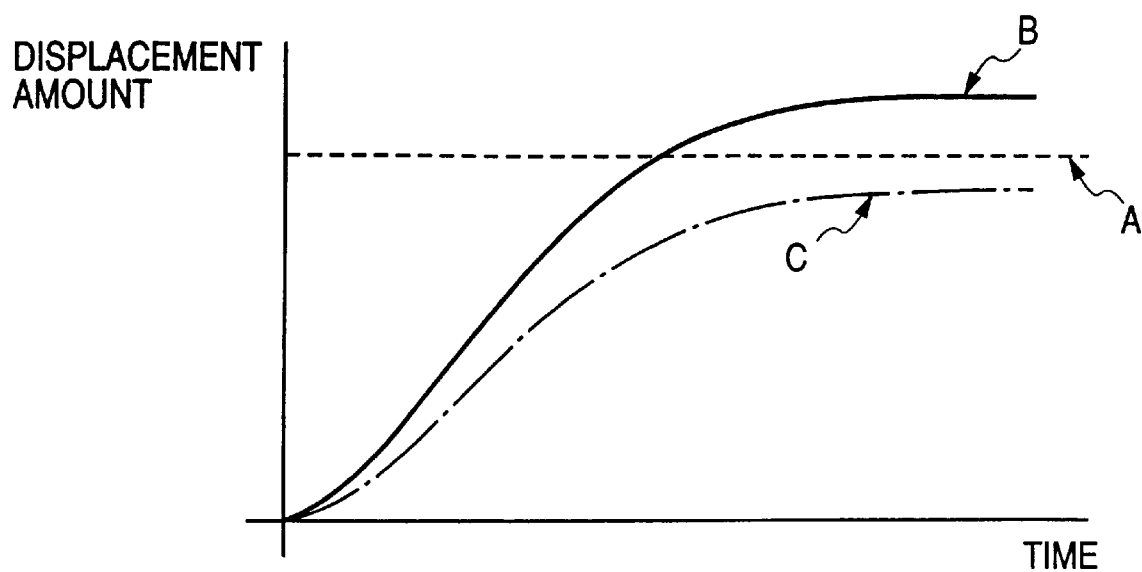
FIG. 6 shows a judgement reference of displacement of an electrode and a preset value.

In FIG. 6, the change of the electrode is enlargedly shown and the reference value for the judgment is indicated. In this case, according to an embodiment in FIG. 4A, when the expansion amount during the welding becomes larger than the preset value (indicated by the broken line A) of the expansion amount, the current supply is stopped.

According to an embodiment in FIG. 4B, the maximum expansion amount during the welding is stored every moment, and, after the welding is completed, compared with the preset expansion amount (indicated by the broken line A). If the maximum expansion amount exceeds the preset reference value (as indicated by the solid line B), the welding result is judged to be "good." If the maximum expansion amount fails to reach the preset reference value (as indicated by the one-dot chain line C), the welding result is judged to be "not good."

Although the servo spot welding gun of the C type has been described as the embodiment of the invention, the spirit of the invention is not restricted to the embodiment. The invention may be easily adaptively executed in various kinds of welders such as a servo spot welding gun of the X type for a robot, a resistance projection spot welder, and a resistance seam welder.

As described above, according to the invention, in a resistance spot welder in which an operation of pressurizing an electrode is conducted by an electric servo motor, an amount of thermal expansion due to production of a weld nugget is detected by reading an encoder which is incorporated in the servo motor, and a weld nugget of a predetermined strength can be obtained.

According to this configuration, a predetermined amount of input heat is ensured, so that an excellent welding quality is surely obtained. Since the encoder is disposed in a place which is on the side of the motor and remote from the electrodes, the encoder is not damaged by splashes and does not suffer from mechanical interference. Since an encoder which is already disposed for a servo control is used also in the detection, the invention is advantageous also in durability and production cost as compared with one using a position sensor.

Further, an amount of thermal expansion due to production of a weld nugget is detected by reading an encoder which is incorporated in a servo motor, the maximum value of the detected amount is held, and, after welding is ended, a quality judgement on a welding result is conducted by comparing the maximum value detected during welding with a preset reference value. If the maximum value fails to reach the reference value, an alarm signal is given to the outside. According to this configuration, a predetermined amount of input heat to the welded part can be surely monitored, and the welding quality can be surely judged.

Still further, the quality of each weld nugget produced by a servo spot welder can be administrated in a centralized manner through a network. Specifically, monitoring results are read into a host computer, and their history is statistically processed to know the wearing state of an electrode chip, the tendency of success in welding position of a specific spot, etc. Furthermore, plural welders can be monitored so that the quality control of a welding line can be conducted.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

The entire disclosure of each and every foreign patent application from which the benefit of foreign priority has been claimed in the present application is incorporated herein by reference, as if fully set forth.

What is claimed is:

1. A control device used for a resistance welder conducting a pressuring operation of an electrode by means of an electric servo motor, said control device comprising:

means for reading an encoder of the servo motor to detect an amount of thermal expansion of a welded part due to a production of a weld nugget in a workpiece pressurized by the electrode of the resistance welder every moment during welding;

means for comparing the detected amount of thermal expansion with a preset reference value; and means for judging that the weld nugget attains a predetermined strength when the detected amount of thermal expansion reaches a preset reference value, thereby stopping a current supply.

2. The control device according to claim 1, wherein said means for reading an encoder reads said encoder to detect a distance moved by the electrode.

3. A control device used for a resistance welder conducting a pressuring operation of an electrode by means of an electric servo motor, said control device comprising:

means for reading an encoder of the servo motor to detect an amount of thermal expansion of a welded part due to a production of a weld nugget in a workpiece pressurized by the electrode of the resistance welder;

means for holding a maximum value of the detected amount during welding;

means for comparing the maximum value detected during welding with a preset reference value to conduct a quality judgement of a welding result after the welding is ended; and means for informing a welding failure if the maximum value fails to reach the reference value.

4. The control device according to claim 3, wherein said means for reading an encoder reads said encoder to detect a distance moved by the electrode.

5. A control device for a resistance welder conducting a pressuring operation of an electrode by way of an electric servo motor, the control device comprising:

a circuit which reads the encoder of the servo motor to detect, every moment during welding, a distance moved by the electrode due to thermal expansion of a welded part upon production of a weld nugget in a workpiece pressurized by the electrode of the resistance welder;

a circuit which compares the detected amount of distance moved by the electrode with a preset reference value; and a circuit for judging that the weld nugget attains a predetermined strength when the detected amount of electrode movement reaches a preset reference value, thereby stopping a current supply.

6. A control device used for a resistance welder conducting a pressuring operation of an electrode by way of an electric servo motor, the control device comprising:

a circuit which reads an encoder of the servo motor to detect, every moment during welding, a distance moved by the electrode due to thermal expansion of a welded part upon production of a weld nugget in a workpiece pressurized by the electrode of the resistance welder;

a storage element which holds a maximum value of the detected distance moved by the electrode during welding;

a circuit which compares the maximum distance value detected during welding with a preset reference distance value to conduct a quality judgement of a welding result after the welding is ended; and a warning device that informs of a welding failure if the maximum distance value fails to reach the reference distance value.

* * * * *